United States Patent [19]

Schrauwen et al.

[11] Patent Number: 5,379,656
[45] Date of Patent: Jan. 10, 1995

[54] METHOD FOR POSITIONING A SENSOR FOR A WEB MOVEMENT CONTROL DEVICE

[75] Inventors: Hans J. Schrauwen, Tannenweg; Theodor Nacke, Milan Weg; Jürgen Bettführ, Vlotho, all of Germany

[73] Assignee: BST Servo-Technik GmbH, Germany

[21] Appl. No.: 16,017

[22] Filed: Feb. 10, 1993

[30] Foreign Application Priority Data

Feb. 11, 1992 [DE] Germany ............... 4203979

[51] Int. Cl.⁶ ............... B65H 23/032; B65H 26/02
[52] U.S. Cl. ............................................. 73/865.9
[58] Field of Search ............ 73/865.8, 865.9, 159; 226/3, 10, 15, 16, 18, 19, 20, 24

[56] References Cited

U.S. PATENT DOCUMENTS

| | | | |
|---|---|---|---|
| 3,568,904 | 3/1971 | Kurz | 226/15 |
| 3,786,974 | 1/1974 | Kron | 226/19 |
| 4,049,213 | 9/1977 | Hank et al. | 226/19 |
| 4,077,579 | 3/1978 | Scleski et al. | 226/20 |
| 4,331,274 | 5/1982 | Halewijn et al. | 226/15 |
| 4,648,539 | 3/1987 | Dingerkus | 226/19 |
| 4,848,632 | 7/1989 | Mack et al. | 226/18 |

FOREIGN PATENT DOCUMENTS 3729982 3/1989 Germany ............... 226/19

OTHER PUBLICATIONS

Japanese Patent Abstract A-60 170 495 Sep. 1985.

*Primary Examiner*—Hezron E. Williams
*Assistant Examiner*—Daniel S. Larkin
*Attorney, Agent, or Firm*—Austin R. Miller

[57] ABSTRACT

A method for positioning a sensor for a web movement control device, in which the sensor executes an edge search process, in order to achieve a rapid and exact positioning of sensors by specifying a relatively early stop threshold for the sensor movement, after-running of the sensor is detected in that after the after-running position is detected by the sensor signal the difference between the preset stop value and the stop value actually reached is formed and specified as the new stop value, after which the edge search process is repeated with the corrected stop value.

5 Claims, 3 Drawing Sheets

METHOD FOR POSITIONING A SENSOR FOR A WEB MOVEMENT CONTROL DEVICE

The invention relates to a method for positioning a sensor for a web movement control device.

In a web movement control devices in which the movement of a web material is controlled by means of a sensor by an optical sensor, for example, the edge of the web is detected in a contact-free manner. During the positioning of the sensor at the edge of the web, the sensor is moved onto the edge of the web from the outside by a sensor adjustment device, after which the sensor is stopped at its working point which usually corresponds to the centre of the sensor aligned with the edge of the web. Since a certain degree of after-running movement of sensor 1, sometimes hereinafter referred to as "after-running", unavoidably occurs after a stop instruction is generated when the sensor is adjusted by means of the sensor adjustment device, it is difficult to position the sensor precisely. After-running depends on the adjustment speed of the sensor adjustment device which can vary from 1 mm/sec to 30 mm/sec, for example and on the measuring range of the respective sensor which can vary between 2 mm and for example 40 mm. With an unfavourable combination of these factors a precise setting of the sensor is very time-consuming.

The invention is based on the object of devising a method such that sensor positioning can be executed rapidly and exactly.

This object is achieved according to the invention by means of the features in the characterising part of claim 1. In this way, after-running of the sensor which unavoidably occurs with a sensor adjustment device is detected and used for exact positioning. The search process is initially stopped with a preset, relatively early stop threshold. The sensor then moves, starting from the stop instruction, further along the edge of the web as a result of after-running, after which the sensor position in the limit position reached is detected by the sensor signal and the electronic control device. The sensor is then moved by a certain distance from the foreseen limit position. By the formation of differences between the stop threshold and the limit position actually reached, after-running is detected and the amount of after-running is used as a corrected stop threshold. With this corrected stop threshold, the search process is repeated. Since after-running does not change, the sensor now stops very near to the preset working point of the sensor. In this way, exact positioning of the sensor can be carried out very rapidly in an automatic fashion.

The invention is explained in greaser detail by way of example with reference to the drawings.

Figure 3:
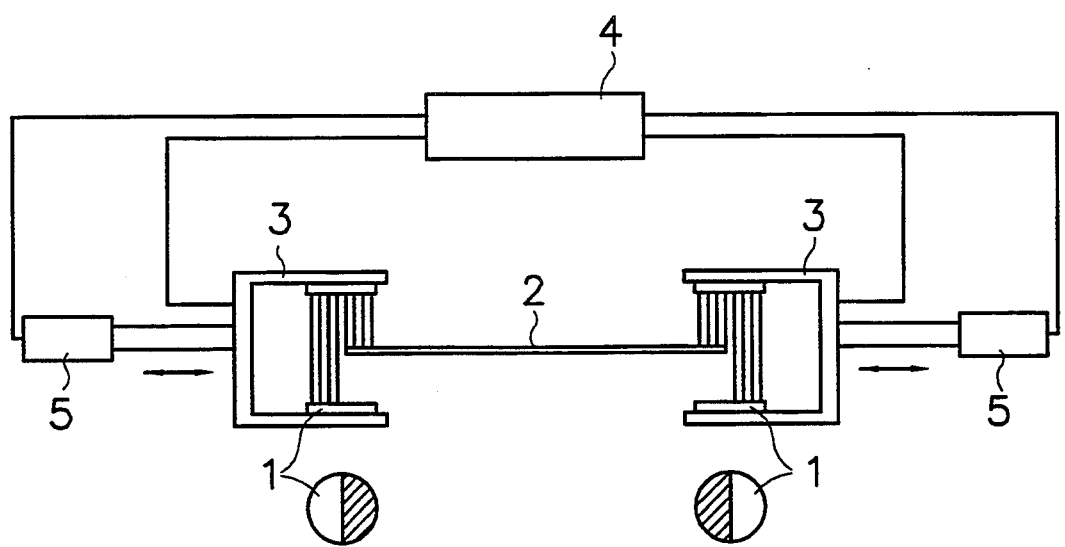
FIG. 3 shows schematically sensors on both sides of a web of material.

FIG. 3 shows a diagrammatic view of circular optical sensors 1 in a U-shaped holder 3, which can be adjusted by a sensor adjustment device 5, on the two sides of a web 2 of material, the edges of web 2 covering half of sensors 1 in each case in this view. At the reference numeral 4, an electronic signal processing and control device is illustrated diagrammatically, which device receives sensor signals and processes them. In addition, the sensor adjustment device 5 for adjusting holders 3 of sensors 1 is controlled by signal processor 4.

Figure 1:
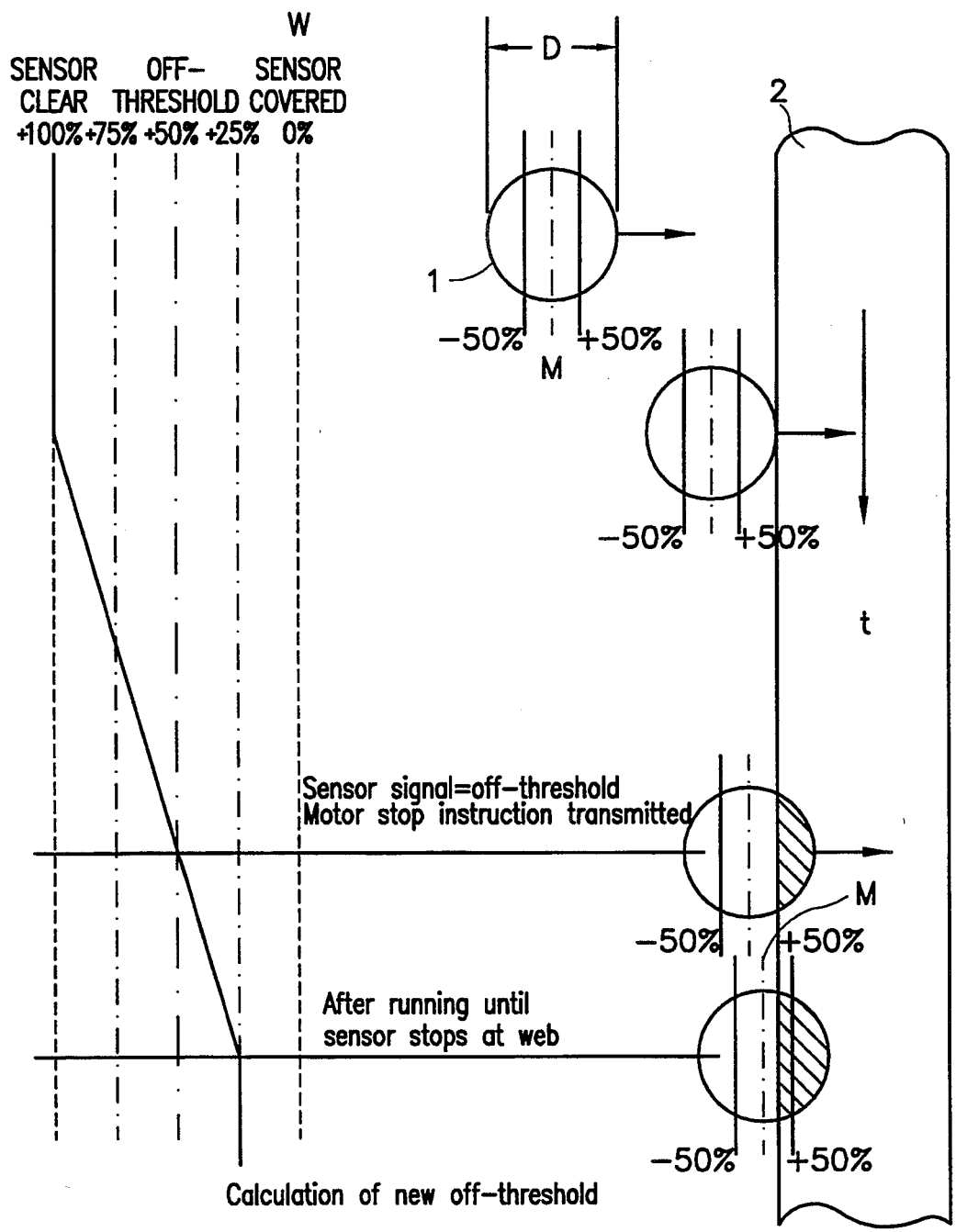
FIG. 1 shows a diagrammatic view of a first step of the edge search process.

FIG. 1 shows a diagrammatic view of a circular optical sensor 1 whose measuring range corresponds to the diameter D. This sensor 1 moves during the edge search process in the direction of the arrow onto web 2 of material by means of the sensor adjustment device 5, such as a motor-driven threaded spindle or the like. The movement of web 2 of material is controlled by a web movement control device (not illustrated). The sensor adjustment device 5 is controlled by means of the electronic signal processor 4 which receives signal values emitted by sensor 1 and processes them for the control and edge search process.

On the left-hand side of FIG. 1, the signal emitted by sensor 1 is entered as a function of the degree of overlap between sensor 1 and web of material 2 over time t. The signal value represented by 100% corresponds to the completely uncovered sensor in the first and second illustrated positions outside web 2 of material, sensor 1 having just reached with its circumference the edge of web 2 of material in the second position. Given further movement of the sensor onto web 2 of material, sensor 1 is partially covered by web 2 of material, as is represented in the third position by the hatched region. The signal value on the left-hand side in FIG. 1 decreases correspondingly, 0% representing that value which corresponds to sensor 1 half covered by web 2.

It is assumed that the centre M of sensor 1 is to be aligned with the edge of web 2 for the exact positioning of sensor 1 so that the centre M of sensor 1 constitutes the working point or control point W of the sensor 1 for the web movement control. In a corresponding way, the centre of sensor 1 is designated by 0% on the left-hand side in FIG. 1, the distance between 0 and 100% corresponding to half the diameter D of the sensor.

Working electronic print W=D/2 is stored in the memory of controller 4 and is used as the basis on which web movement control is stopped. In use a first stop threshold is preset at 50% of the sensor radius ($\frac{1}{4}$ coverage of sensor 1), after which sensor adjustment device receives a stop instruction as soon as sensor 1 covers half the radius of sensor 1 by web 2, as is represented in the third position in FIG. 1 at which the edge of the web corresponds to the stop threshold of 50% ($\frac{1}{4}$ coverage of sensor 1). The signal emitted by sensor 1 at this position triggers a motor stop instruction for sensor adjustment device.

Owing to after-running of sensor adjustment device, sensor 1 moves, despite the motor stop instruction further towards the web 2 until it comes to a standstill, such as for example, at position represented at the bottom in FIG. 1, in which position web 2 covers 75% of the half of sensor 1 ($\frac{3}{8}$ coverage of sensor 1) and and the edge of the web is therefore still 25% of the radius of the sensor away from the centre M of the sensor. This detected stop value of 25% is specified as the new stop threshold in the electronic control device or the originally preset stop threshold of 50% is replaced by the new stop threshold 25% (50−25=25%).

Figure 2:
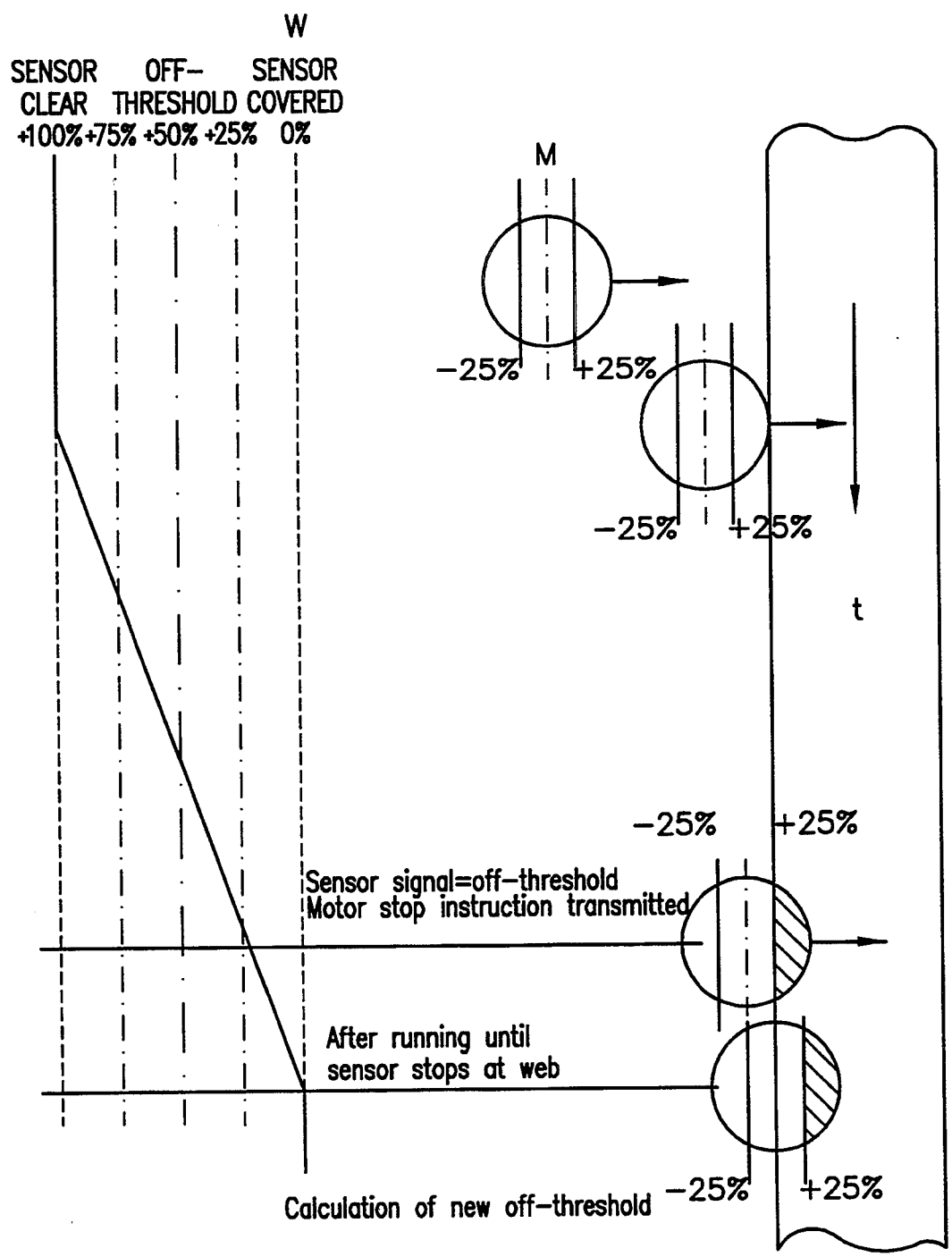
FIG. 2 shows a subsequent second step.

Then, sensor 1 is moved back from web 2 of material after which a renewed edge search process with the new stop threshold of 25% is triggered by control device 4, which process is represented in FIG. 2.

In FIG. 2, sensor 1 is moved onto web 2 with the new stop threshold at 25%, after which the motor stop instruction is triggered with a sensor signal of 25% if the edge of web 2 is aligned with the stop threshold 25% on sensor 1. After-running of sensor 1 is usually the same as in the first edge search process according to FIG. 1, it being assumed that the adjustment speed of sensor 1 is the same in the first and second edge search processes. Correspondingly, in the second edge search process according to FIG. 2 sensor 1 is located, by means of its after-running, very closely to the foreseen limit position in which the centre of sensor 1 is aligned with the edge of web 2, that is to say the sensor is half covered by web 2.

If the centre of sensor 1 only reaches a limit position of, for example, 30% of the radius of the sensor with the first stop threshold of 50% with after running, 50−30%=20% is specified as the new stop threshold for the second edge search process.

On both sides of the centre M of sensor 1, a tolerance window of for example 5%, that is to say a total of 10%, is provided. If, during the edge search process with this tolerance window, sensor 1 reaches the edge of web 2 so that the edge lies within the tolerance window, the edge search process is terminated.

If, during the second edge search process according to FIG. 2, the tolerance window of sensor 1 does not yet lie on the edge of web 2 and the centre of sensor 1 still lies at a distance for example 10% of the radius of sensor 1 away from the edge of web 2, a further stop threshold is specified at 25−10%=15% or 20−10%=10% and a renewed edge search process is executed with this corrected stop threshold.

In order to compensate for residual error, occurring as a result of the tolerance window during the positioning of the sensor when the centre of the sensor lies, for example, within the tolerance window next to the edge of web 2, the last signal value of sensor 1, to be obtained, which value deviates for example by 3% from the working point W=0%, is determined in electronic signal processor 4 as a new working point W′ or set as the set value so that web movement control can continue to operate with the preset parameters. Thus, it is not sensor 1 which is aligned with the edge of web 2 over the last residual amount but rather the last working point or control point W′ to be reached during the edge search process is set in place of the control point W. The control then operates with a control point W′=3% instead of W=0%.

In addition to the preset tolerance window, a residual error can also occur when positioning the sensors if step motors or synchronous motors which cannot be stopped at a desired point are used for the sensor adjustment device. Thus, it may only be possible to stop the motor for example at specific intervals of 0.3 mm. In this case also, the last control point W′ to be obtained for the control is set as the set value, and not the original control value W. It would only be possible to position the sensors mechanically to for example 1/10 accuracy with a large degree of expenditure whilst in electronic processor 4 the control point W′ of an imprecise sensor position can be set very accurately to a set value or W=0. As a result, a high degree of accuracy of the search process is achieved which is greater than that provided by a motor stop at intervals of 0.3 mm.

Preferably, on both sides of the centre M of sensor 1 a stop threshold is preset as represented in FIGS. 1 and 2, so that the edge search process can be started inside and outside the edge of web 2.

The method described for sensor positioning can also be used with other open-loop and closed-loop control devices as well as for controlling the movement of a web. Likewise, in this way sensors other than optical ones, for example pneumatic or inductive sensors, can also be positioned quickly and accurately.

The method described for positioning a sensor is executed automatically for each edge search process so that sensor after-running is compensated for during each new search process.

We claim:

1. In a method for positioning a sensor in a web sheet movement controller, wherein the sensor is moved by a sensor adjuster onto and away from an edge of said sheet and is held in a preset position by means of an electronic controller which controls the sensor adjuster, which controller processes sensor signals, and wherein a preset stop value for sensor movement is specified by the controller, the steps comprising:
  a) causing the controller to issue a stop instruction to the sensor adjuster when the sensor reaches the stop value,
  b) moving the sensor onto an edge of the sheet subsequent to after-running of the sensor,
  c) determining a limit position reached after after-running of the sensor,
  d) calculating a new stop value based on said preset stop value and a stop value actually reached,
  e) repeating step a) with the new stop value, and
  f) presetting a tolerance window in the electronic controller at a working point (W) and generating a signal for terminating edge searching if an edge of the sheet lies in the tolerance window.

2. The method according to claim 1, further comprising compensating for residual error of the sensor position by specifying that said stop value actually reached is a control value in the controller for further sheet movement control.

3. In a method for positioning a sensor in a control device, wherein said sensor has a measuring range and a working point and is moved by a sensor adjuster, being stopped in a desired end position by means of an electronic controller, which controls said sensor adjuster and processes sensor signals, the method comprising the steps of:
  a) presetting a first stop position within said measuring range of the sensor, said first position being at a distance from said working point;
  b) moving said sensor towards a desired end position;
  c) issuing a stop signal from said controller to said sensor adjuster as soon as said first stop position reaches said desired end position, whereupon said sensor moves by after-running and stops in a preliminary end position;
  d) sensing said preliminary end position with said sensor;
  e) comparing said preliminary end position with said first stop position in said controller,
  f) presetting a second stop position a new distance from said working point, which equals the distance between said preliminary end position and said first stop position caused by after-running, and
  g) repeating step b) using said second stop position so that the working point reaches said desired end position by after-running, when said sensor is stopped at said second stop position.

4. The method according to claim 3, further comprising presetting a tolerance window in said electronic controller at a working point (W) and generating a signal for terminating edge searching if an edge of the sheet lies in the tolerance window.

5. The method according to claim 4, further comprising compensating for residual error of said desired end position by specifying that said preliminary end position is a control value in said electronic controller for further sheet movement control.

* * * * *